United States Patent
Madelone, Jr. et al.

(10) Patent No.: US 11,084,208 B2
(45) Date of Patent: Aug. 10, 2021

(54) ADDITIVE MANUFACTURING SYSTEMS AND METHODS INCLUDING LOUVERED PARTICULATE CONTAINMENT WALL

(71) Applicant: General Electric Company, Schenectady, NY (US)

(72) Inventors: John Joseph Madelone, Jr., South Glen Falls, NY (US); Adam G. Susong, Loveland, OH (US); Timothy Joseph Wilhelm, Miamisburg, OH (US); Andrew J. Martin, Blue Ash, OH (US); Donald Dana Lowe, Bow, NH (US)

(73) Assignee: General Electric Company, Schenectady, NY (US)

(*) Notice: Subject to any disclaimer, the term of this patent is extended or adjusted under 35 U.S.C. 154(b) by 335 days.

(21) Appl. No.: 16/163,121

(22) Filed: Oct. 17, 2018

(65) Prior Publication Data

US 2020/0122393 A1    Apr. 23, 2020

(51) Int. Cl.
*B29C 64/153* (2017.01)
*B29C 64/255* (2017.01)
(Continued)

(52) U.S. Cl.
CPC ............ *B29C 64/153* (2017.08); *B22F 10/20* (2021.01); *B29C 64/245* (2017.08);
(Continued)

(58) Field of Classification Search
CPC .............................. B29C 64/153; B29C 64/35
See application file for complete search history.

(56) References Cited

U.S. PATENT DOCUMENTS 5,056,460 A * 10/1991 Vohringer ............... B05B 14/48
                                                            118/634
6,375,874 B1    4/2002 Russell et al.
(Continued)

FOREIGN PATENT DOCUMENTS

EP    3053720 A1 * 8/2016 ........... B29C 64/153
WO    9534468 A1    12/1995
(Continued)

OTHER PUBLICATIONS

Vayre, "Identification on Some Design Key Parameters for Additive Manufacturing: Application on Electron Beam Melting", Procedia CIRP, vol. 7, pp. 264-269, Grenoble, France, 2013.

*Primary Examiner* — Atul P. Khare
(74) *Attorney, Agent, or Firm* — Dority & Manning, P.A.

(57) ABSTRACT

Methods and systems for fabricating a component by consolidating a first portion of a particulate include a louvered particulate containment wall positioned around the component and a second portion of the particulate. At least one louver is coupled to the particulate containment wall adjacent at least one opening in the particulate containment wall. The particulate containment wall is positionable between a first position in which the louver prevents the second portion of the particulate from flowing through the passage and a second position in which the second portion of the particulate is able to flow through the passage. The methods include switching the particulate containment wall from the first position to the second position and allowing the second portion of the particulate to flow out of the interior space through the at least one opening.

11 Claims, 5 Drawing Sheets

(51) Int. Cl.
    *B29C 64/245*     (2017.01)
    *B22F 10/20*     (2021.01)
    *B33Y 40/20*     (2020.01)
    *B29C 64/35*     (2017.01)
    *B33Y 10/00*     (2015.01)
    *B33Y 30/00*     (2015.01)
    *B33Y 40/00*     (2020.01)

(52) U.S. Cl.
    CPC ............ *B29C 64/255* (2017.08); *B29C 64/35* (2017.08); *B33Y 40/20* (2020.01); *B33Y 10/00* (2014.12); *B33Y 30/00* (2014.12); *B33Y 40/00* (2014.12)

(56) References Cited

U.S. PATENT DOCUMENTS

| | | | |
|---|---|---|---|
| 6,932,935 B1* | 8/2005 | Oberhofer | B33Y 10/00 264/497 |
| 2002/0090410 A1* | 7/2002 | Tochimoto | B29C 64/321 425/215 |
| 2004/0084814 A1* | 5/2004 | Boyd | B33Y 40/00 264/497 |
| 2008/0241404 A1 | 10/2008 | Allaman et al. | |
| 2009/0211616 A1* | 8/2009 | Tafoya | B08B 3/045 134/57 R |
| 2013/0075957 A1* | 3/2013 | Swanson | B29C 64/40 264/405 |
| 2013/0244040 A1* | 9/2013 | Oshima | B32B 5/16 428/411.1 |
| 2015/0258744 A1* | 9/2015 | Muller | B29C 64/165 264/37.29 |
| 2016/0074940 A1* | 3/2016 | Cote | B29C 64/35 134/23 |
| 2017/0232670 A1 | 8/2017 | Joerger et al. | |
| 2017/0348771 A1 | 12/2017 | Kawada et al. | |
| 2018/0001384 A1 | 1/2018 | Manteiga et al. | |
| 2018/0154580 A1* | 6/2018 | Mark | B29C 64/35 |
| 2018/0169945 A1 | 6/2018 | Chanclon et al. | |
| 2018/0281284 A1* | 10/2018 | Elgar | B29C 64/364 |
| 2019/0193148 A1* | 6/2019 | Kiener | B29C 64/153 |
| 2019/0240913 A1* | 8/2019 | Jordan | B29C 64/165 |
| 2020/0164466 A1* | 5/2020 | Sievers | B29C 64/153 |

FOREIGN PATENT DOCUMENTS

| | | | | |
|---|---|---|---|---|
| WO | 2017194387 A1 | 11/2017 | | |
| WO | WO-2017194144 A1 * | 11/2017 | ......... | B29C 37/0003 |

\* cited by examiner

ADDITIVE MANUFACTURING SYSTEMS AND METHODS INCLUDING LOUVERED PARTICULATE CONTAINMENT WALL

BACKGROUND

The subject matter described herein relates generally to additive manufacturing systems and, more particularly, to additive manufacturing systems including a louvered particulate containment wall.

At least some known additive manufacturing systems involve the consolidation of a particulate to fabricate a component. Such techniques facilitate producing complex components from expensive materials at a reduced cost and with improved manufacturing efficiency. At least some known additive manufacturing systems, such as Direct Metal Laser Melting (DMLM), Selective Laser Melting (SLM), Direct Metal Laser Sintering (DMLS), and Laser-CUSING® systems, fabricate components using a focused energy source, such as a laser device or an electron beam generator, a build platform, and a particulate, such as, without limitation, a powdered metal. (LaserCUSING is a registered trademark of Concept Laser GmbH of Lichtenfels, Germany.)

In at least some DMLM systems, a particulate containment wall defines an interior space and retains the particulate within the interior space during fabrication of the component to facilitate precise fabrication of the component and to control the amount of particulate required to fabricate the component. After fabrication of the component, the unconsolidated particulate is removed from the interior space. However, the processes for removing unconsolidated particulate from the interior space could be improved and the time required for removing the unconsolidated particulate from the interior space could be further reduced. Moreover, in at least some known systems, the unconsolidated particulate is inaccessible from the exterior of the particulate containment wall. Accordingly, at least some known additive manufacturing systems include vacuum systems that allow for removal of the unconsolidated particulate through ports in the particulate containment wall. However, it is difficult to control the flow of the particulate through the ports in at least some known systems. Moreover, vacuum systems increase the cost of the additive manufacturing systems.

Accordingly, there is a need for an improved additive manufacturing system that allows for removal of the unconsolidated particulate in a reduced time.

BRIEF DESCRIPTION

In one aspect, a method of fabricating a component using an additive manufacturing system is provided. The method includes depositing a particulate onto a build platform of the additive manufacturing system and consolidating a first portion of the particulate to form the component. A second portion of the particulate is unconsolidated. The method also includes positioning a particulate containment wall around the component and the second portion of the particulate. The particulate containment wall defines an interior space and at least one opening therethrough. The component and the second portion of the particulate are positioned within the interior space. The method further includes coupling at least one louver to the particulate containment wall adjacent the at least one opening in the particulate containment wall. The at least one louver defines a passage in flow communication with the at least one opening. The method also includes switching the particulate containment wall from a first position in which the louver prevents the second portion of the particulate from flowing through the passage to a second position in which the second portion of the particulate is able to flow through the passage. The method further includes allowing the second portion of the particulate to flow out of the interior space through the at least one opening.

In another aspect, an additive manufacturing system is provided. The additive manufacturing system includes a build platform configured to receive a particulate and a consolidation device configured to consolidate a first portion of the particulate to form a component. A second portion of the particulate is unconsolidated. The additive manufacturing system also includes a particulate containment wall positioned around the component and the second portion of the particulate. The particulate containment wall defines an interior space and at least one opening therethrough. The component and the second portion of the particulate are positioned within the interior space. The additive manufacturing system further includes at least one louver coupled to the particulate containment wall adjacent the at least one opening in the particulate containment wall. The at least one louver defines a passage in flow communication with the at least one opening. The particulate containment wall is positionable between a first position in which the louver prevents the second portion of the particulate from flowing through the passage and a second position in which the second portion of the particulate is able to flow through the passage. The second portion of the particulate is allowed to flow out of the interior space through the at least one opening when the particulate containment wall is in the second position.

In yet another aspect, a particulate containment wall for use in an additive manufacturing system is provided. The additive manufacturing system includes a consolidation device configured to consolidate a first portion of a particulate to form a component. A second portion of the particulate is unconsolidated. The particulate containment wall includes an inner surface and an outer surface opposite the inner surface. The particulate containment wall defines an interior space and at least one opening extending from the inner surface to the outer surface. The component and the second portion of the particulate are positioned within the interior space. The particulate containment wall further includes at least one louver coupled to the inner surface adjacent the at least one opening. The at least one louver defines a passage in flow communication with the at least one opening. The particulate containment wall is positionable between a first position in which the louver prevents the second portion of the particulate from flowing through the passage and a second position in which the second portion of the particulate is able to flow through the passage. The second portion of the particulate is allowed to flow out of the interior space through the at least one opening when the particulate containment wall is in the second position.

DRAWINGS

These and other features, aspects, and advantages of the present disclosure will become better understood when the following detailed description is read with reference to the accompanying drawings in which like characters represent like parts throughout the drawings, wherein.

Figure 1:
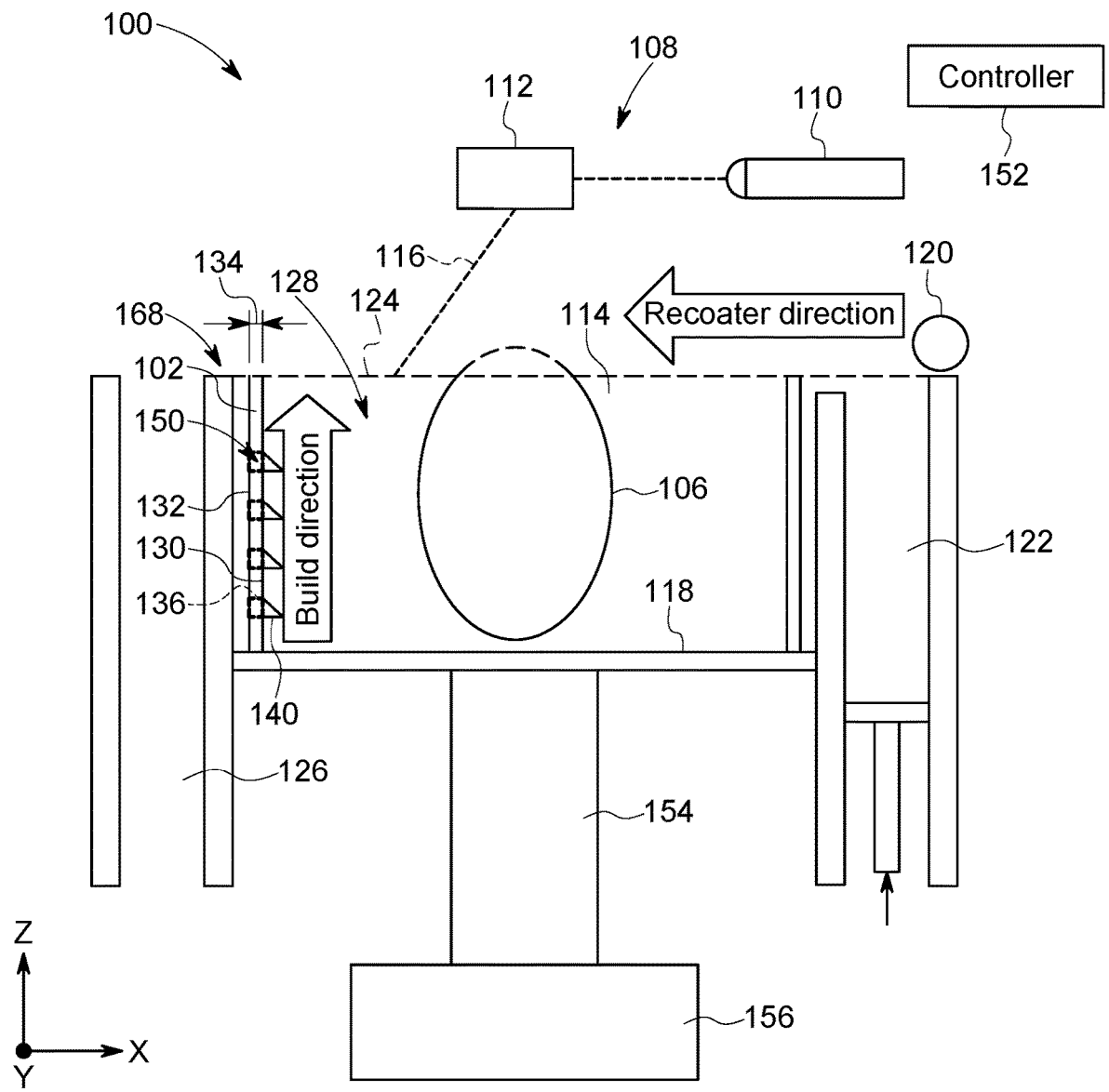
FIG. 1 is a schematic view of an exemplary additive manufacturing system including a particulate containment wall.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "substantially particulate-free region" refers to any non-constrained portion of a build platform in which the particulate deposited thereon is insubstantial enough that it is not intended to be used in a build process of an additive manufacturing system. In other words, a substantially particulate-free region of a build platform may contain particulate not constrained by a portion of the additive manufacturing system and resulting from spill-over of particles from within an additively manufactured structure. However, a substantially particulate-free region may not contain a sufficient quantity of particles such that the particulate is intended to be used in the build process of an additive manufacturing system. Specifically, a substantially particulate-free region does not contain a quantity of particles intended to be consolidated by a consolidation device to form a component in an additive manufacturing system.

In addition, as used herein, the term "louver" refers to a component extending adjacent an opening to restrict movement of material through the opening. The term "louvered" refers to a structure including at least one louver.

Additive manufacturing processes and systems include, for example, and without limitation, vat photopolymerization, powder bed fusion, binder jetting, material jetting, sheet lamination, material extrusion, directed energy deposition and hybrid systems. These processes and systems include, for example, and without limitation, SLA—Stereolithography Apparatus, DLP—Digital Light Processing, 3SP—Scan, Spin, and Selectively Photocure, CLIP—Continuous Liquid Interface Production, SLS—Selective Laser Sintering, DMLS—Direct Metal Laser Sintering, SLM—Selective Laser Melting, EBM—Electron Beam Melting, SHS—Selective Heat Sintering, MJF—Multi-Jet Fusion, 3D Printing, Voxeljet, Polyjet, SCP—Smooth Curvatures Printing, MJM—Multi-Jet Modeling ProJet, LOM—Laminated Object Manufacture, SDL—Selective Deposition Lamination, UAM—Ultrasonic Additive Manufacturing, FFF—Fused Filament Fabrication, FDM—Fused Deposition Modeling, LMD—Laser Metal Deposition, LENS—Laser Engineered Net Shaping, DMD—Direct Metal Deposition, Hybrid Systems, and combinations of these processes and systems. These processes and systems may employ, for example, and without limitation, all forms of electromagnetic radiation, heating, sintering, melting, curing, binding, consolidating, pressing, embedding, and combinations thereof.

Additive manufacturing processes and systems employ materials including, for example, and without limitation, polymers, plastics, metals, ceramics, sand, glass, waxes, fibers, biological matter, composites, and hybrids of these materials. These materials may be used in these processes and systems in a variety of forms as appropriate for a given material and the process or system, including, for example, and without limitation, as liquids, solids, powders, sheets, foils, tapes, filaments, pellets, liquids, slurries, wires, atomized, pastes, and combinations of these forms.

The systems and methods described herein include an additive manufacturing system including a louvered particulate containment wall. The louvered particulate containment wall defines an interior space and retains particulate within the interior space to facilitate precise fabrication of a component and to control the amount of particulate required to fabricate the component. The louvered particulate containment wall includes at least one opening and at least one louver extending adjacent the at least one opening. The at least one louver is positioned to prevent unconsolidated particulate from exiting the interior space through the at least one opening when the louvered particulate containment wall is in a first position. For example, in some embodiments, the at least one louver and the opening define a passage that is angled relative to a planar surface of the louvered particulate containment wall such that the louver prevents particulate from entering the opening when the particulate containment wall is in a vertical position. The louvered particulate containment wall may be positioned in a second position that allows particulate to flow through the at least one opening in the louvered particulate containment wall. Accordingly, the additive manufacturing system facilitates the controlled removal of unconsolidated particulate from the interior space of the particulate containment wall after fabrication of the component.

FIG. 1 is a schematic view of an exemplary additive manufacturing system 100 including a particulate containment wall 102. A coordinate system of additive manufacturing system 100 includes an X-axis, a Y-axis, and a Z-axis. Additive manufacturing system 100 builds objects, for example, a part or component 106. In the exemplary embodiment, additive manufacturing system 100 includes a consolidation device 108 including a laser device 110 and a scanning device 112. Additive manufacturing system 100 is configured for fabricating component 106 using a layer-by-layer manufacturing process by sintering or melting a particulate 114 using an energy beam 116 generated by a source such as laser device 110. For example, in some embodiments, additive manufacturing system 100 is used for direct metal laser sintering (DMLS) or direct metal laser melting (DMLM). Laser device 110 provides a high-intensity heat source configured to generate a melt pool in a bed of particulate 114 using energy beam 116. Alternatively, consolidation device 108 may include any component that facilitates consolidation of a material using any of the processes and systems described herein.

In the exemplary embodiment, additive manufacturing system 100 further includes a build platform 118, a recoater arm 120, and a reservoir 122. During operation of additive manufacturing system 100, particulate 114 is supplied by reservoir 122 and spread evenly over build platform 118 using recoater arm 120. Recoater arm 120 is configured to maintain the particulate at a particulate level 124 and remove excess particulate material extending above particulate level 124 to a particulate container 126. Energy beam 116 consolidates a first portion of particulate 114 to form a cross sectional layer of component 106. After selective consolidation of the layer of particulate 114, build platform 118 is lowered and another layer of particulate 114 is spread over build platform 118 and component 106, followed by successive consolidation of the layer of particulate 114 by laser device 110. The process is repeated until component 106 is completely built up from the consolidated portion of particulate 114.

Also, in the exemplary embodiment, a second, unconsolidated portion of particulate 114 is positioned on build platform 118 surrounding and/or within cavities of component 106. Particulate containment wall 102 defines an interior space 128 and at least partially surrounds particulate 114 and component 106. Accordingly, particulate containment wall 102 is configured to facilitate retaining particulate 114 around component 106 to reduce the quantity of particulate 114 required for operation of additive manufacturing system 100 and to improve the quality of component 106. In the exemplary embodiment, particulate containment wall 102 is generally rectangular and fully surrounds particulate 114 on build platform 118. In alternative embodiments, particulate containment wall 102 may be any shape that facilitates operation of particulate containment wall 102 as described herein. In further embodiments, particulate containment wall 102 may surround a portion of particulate 114 and/or may be coupled to any other wall or component that facilitates operation of additive manufacturing system 100 as described herein.

In the exemplary embodiment, particulate containment wall 102 is formed by a third portion of particulate 114 that has been consolidated using the consolidation process described herein. Particulate containment wall 102 extends along the Z-direction generally parallel to the build direction. Particulate containment wall 102 is substantially solid and includes an inner surface 130 and an outer surface 132 defining a thickness 134 therebetween. Inner surface 130 is positioned against particulate 114 during fabrication of component 106. Outer surface 132 faces a substantially particle-free region during fabrication of component 106 and is positioned opposite inner surface 130 and particulate 114. In the exemplary embodiment, inner surface 130 and outer surface 132 are substantially planar. In alternative embodiments, at least one of inner surface 130 and outer surface 132 is at least one of convex shaped and concave shaped. In further embodiments, particulate containment wall 102 may be tapered along the Z-direction such that thickness 134 of a first portion of particulate containment wall 102 is greater than thickness 134 of a second portion of particulate containment wall 102.

Also, in the exemplary embodiment, particulate containment wall 102 defines at least one opening 136 extending through thickness 134 of particulate containment wall 102 from inner surface 130 to outer surface 132. In the exemplary embodiment, particulate containment wall 102 defines a plurality of openings 136. For example, openings 136 are arranged in columns along the Z-direction and rows in the Y-direction to form a grid pattern. As a result, particulate containment wall 102 includes a plurality of openings 136 that are spaced apart in the Z-direction and the Y-direction. Some openings 136 are positioned adjacent build platform 118 and other openings 136 are spaced from build platform 118. Openings 136 may be aligned with a lower, intermediate, or upper portion of component 106 and/or with cavities within component 106. In alternative embodiments, particulate containment wall 102 defines any opening(s) 136 that enables additive manufacturing system 100 to operate as described herein. For example, in some embodiments, at least one opening 136 is positioned randomly relative to other openings 136 in particulate containment wall 102.

In addition, in the exemplary embodiment, particulate containment wall 102 includes at least one louver 140 coupled to inner surface 130 adjacent opening 136. In the exemplary embodiment, particulate containment wall 102 includes a plurality of louvers 140 and each louver of the plurality of louvers 140 is positioned adjacent a respective opening 136 in particulate containment wall 102. Specifically, each louver 140 is positioned at least partially above the corresponding opening 136 and configured to prevent flow of particulate 114 into opening 136 from above opening 136 when particulate containment wall 102 is in a first, vertical position 168. Each opening 136 and the adjacent louver 140 collectively define a passage 150 sized for particulate 114 to flow therethrough when particulate containment wall 102 is in a second position 170 (shown in FIG. 6). In alternative embodiments, additive manufacturing system 100 includes any louver 140 that enables additive manufacturing system 100 to operate as described herein. For example, in some embodiments, at least one of louvers 140 is positioned adjacent to two or more openings 136 to restrict particulate flow through the two or more openings 136.

Moreover, in the exemplary embodiment, additive manufacturing system 100 also includes a computer control system, or controller 152. Controller 152 controls consolidation device 108 to facilitate directing energy beam 116 along the surface of particulate 114 of a build layer to form a layer of component 106 within particulate containment wall 102. For example, scanning device 112 is controlled by controller 152 and is configured to move a mirror such that energy beam 116 is reflected to be incident along a predetermined scan path along build platform 118, such as, for example, and without limitation, a linear, rotational, and/or asymmetric scan path. In some embodiments, scanning device 112 includes a two-dimension scan galvanometer, a three-dimension (3D) scan galvanometer, dynamic focusing galvanometer, and/or any other scanning device that may be used to deflect energy beam 116 of laser device 110. In alternative embodiments, energy beam 116 is moved in any orientation and manner that enables additive manufacturing system 100 to operate as described herein.

In the exemplary embodiment, build platform 118 is mounted to a support structure 154, which is moved by an actuator system 156. Actuator system 156 is configured to move support structure 154 in the Z-direction (i.e., normal to a top surface of build platform 118). In some embodiments, actuator system 156 is also configured to move support structure 154 in the XY plane. For example, and without limitation, in an alternative embodiment, actuator system 156 moves support structure 154 in the XY plane to cooperate with scanning device 112 to direct energy beam 116 of laser device 110 along the scan path about build platform 118. In the exemplary embodiment, actuator system 156 includes, for example and without limitation, a linear motor(s), a hydraulic and/or pneumatic piston(s), a screw drive mechanism(s), and/or a conveyor system.

In the exemplary embodiment, additive manufacturing system 100 is operated to fabricate component 106 from a computer modeled representation of the 3D geometry of component 106. The computer modeled representation may be produced in a computer aided design (CAD) or similar file. The CAD file of component 106 is converted into a layer-by-layer format that includes a plurality of build parameters for each layer of component 106. For example, a build layer of component 106 includes a particulate to be consolidated by additive manufacturing system 100. In the exemplary embodiment, component 106 is modeled in a desired orientation relative to the origin of the coordinate system used in additive manufacturing system 100. The geometry of component 106 is sliced into a stack of layers of a desired thickness, such that the geometry of each layer is an outline of the cross-section through component 106 at that particular layer location. Scan paths are generated across the geometry of a respective layer. The build parameters are applied along each scan path to fabricate that layer of component 106 from particulate 114 used to construct component 106. The steps are repeated for each respective layer of component 106 geometry. Once the process is completed, an electronic computer build file (or files) is generated, including all of the layers. The build file is loaded into controller 152 of additive manufacturing system 100 to control the system during fabrication of each layer.

After the build file is loaded into controller 152, additive manufacturing system 100 is operated to generate component 106 by implementing the layer-by-layer manufacturing process, such as a direct metal laser melting method. The exemplary layer-by-layer additive manufacturing process does not use a pre-existing article as the precursor to the final component, rather the process produces component 106 from a raw material in a configurable form, such as particulate 114. For example, and without limitation, a steel component can be additively manufactured using a steel powder. Additive manufacturing system 100 enables fabrication of components, such as component 106, using a broad range of materials, for example, and without limitation, metals, ceramics, glass, and polymers.

Figure 2:
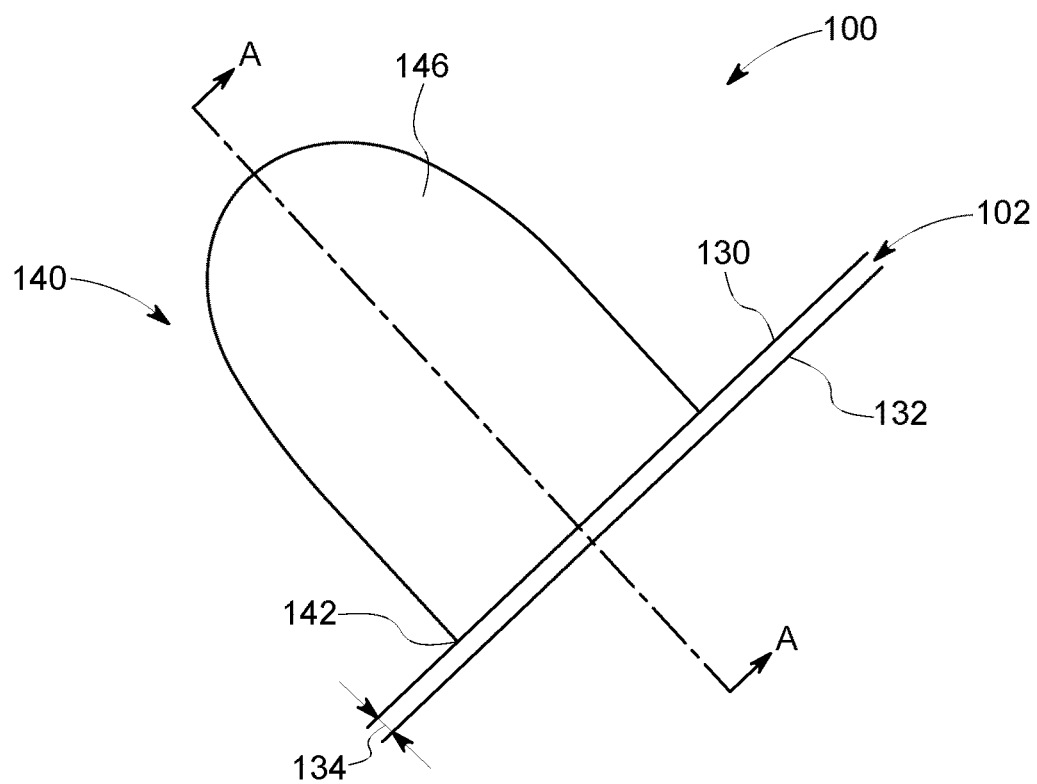
FIG. 2 is an enlarged top view of a louver of the particulate containment wall shown in FIG. 1.
Figure 3:
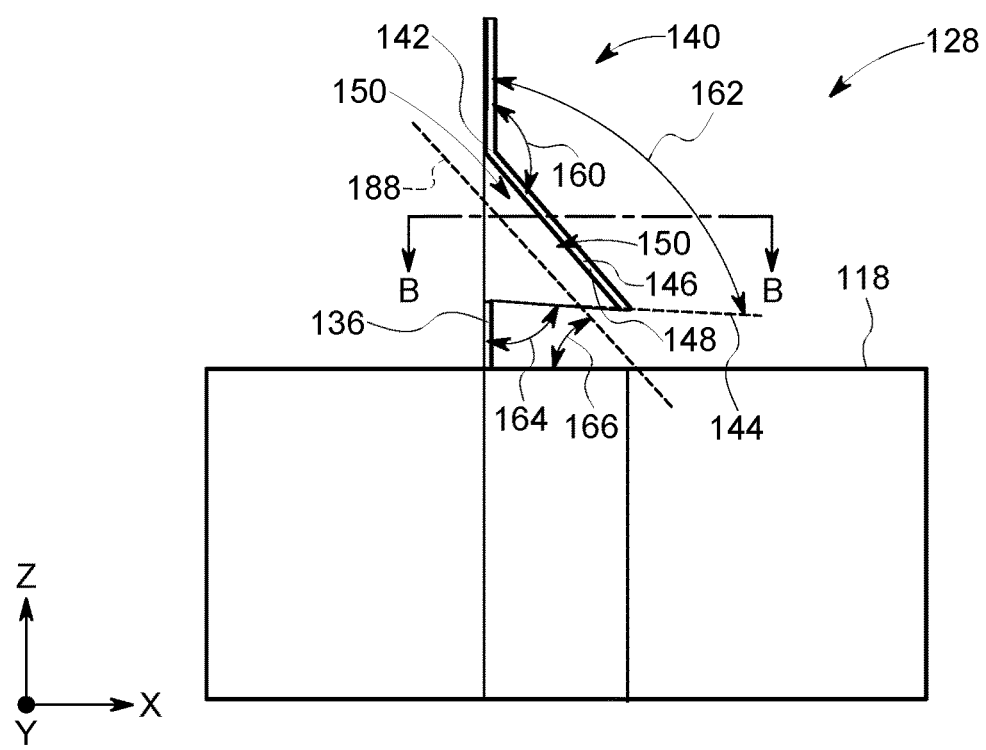
FIG. 3 is a sectional view of the louver shown in FIG. 2 taken along section line A-A.
Figure 4:
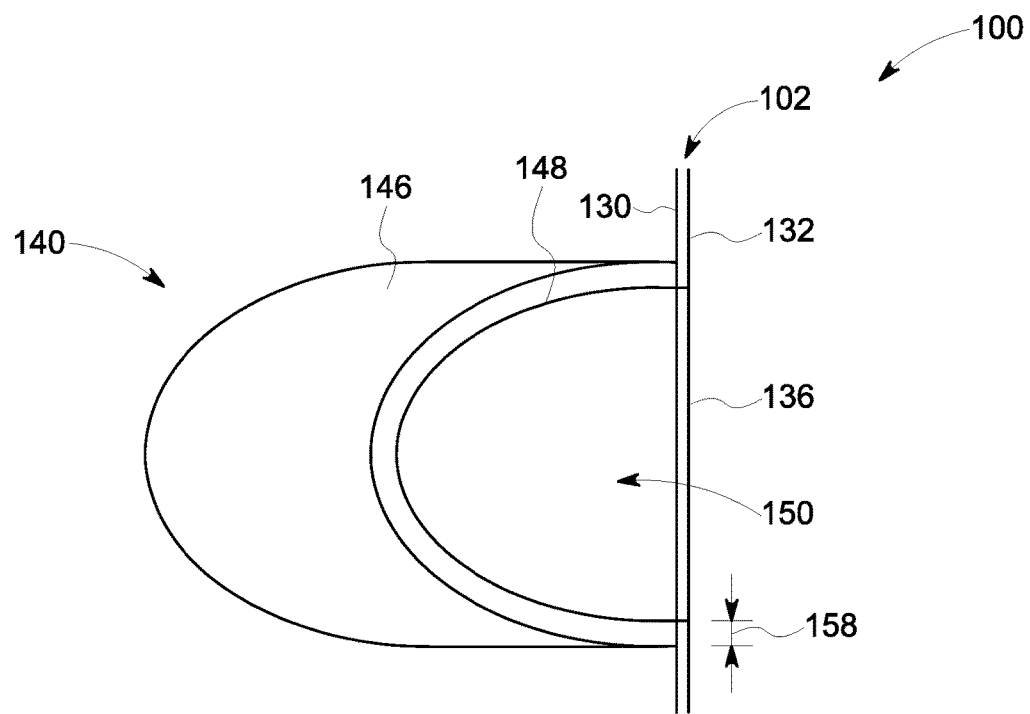
FIG. 4 is a sectional view of the louver shown in FIGS. 2 and 3 taken along section line B-B.

FIG. 2 is an enlarged top view of louver 140 of particulate containment wall 102. FIG. 3 is a sectional view of louver 140 taken along section line A-A. FIG. 4 is a sectional view of louver 140 taken along section line B-B. Louver 140 comprises a proximal end 142, a distal end 144, an outer surface 146, and an inner surface 148. Outer surface 146 and inner surface 148 extend from proximal end 142 to distal end 144 and define a thickness 158 of louver 140. Proximal end 142 of louver 140 is coupled to inner surface 130 of particulate containment wall 102. Specifically, in the exemplary embodiment, louver 140 and particulate containment wall 102 are integrally formed as a single piece. In alternative embodiments, louver 140 and particulate containment wall 102 may be formed separately and louver 140 attached to particulate containment wall 102. Moreover, proximal end 142 is coupled to particulate containment wall 102 such that proximal end 142 circumscribes opening 136. In the exemplary embodiment, opening 136 and proximal end 142 are circular. In alternative embodiments, opening 136 and louver 140 are any shape that enables particulate containment wall 102 to function as described herein.

Also, in the exemplary embodiment, outer surface 146 and inner surface 148 of louver 140 extend at an angle 160 relative to particulate containment wall 102. Specifically, outer surface 146 and inner surface 148 of louver 140 extend away from inner surface 130 of particulate containment wall 102 in a generally downward direction from proximal end 142 to distal end 144 such that distal end 144 is aligned with a bottom edge of opening 136 or positioned below opening 136. In some embodiments, angle 160 is acute, i.e., greater than 0° and less than 90°. In addition, distal end 144 lies in a plane that extends at an angle 162 relative to inner surface 130 and proximal end 142. In the exemplary embodiment, angle 162 is at least 90°. Also, distal end 144 is located below at least a portion of proximal end 142 and opening 136 when particulate containment wall 102 is vertical, i.e., parallel to the Z-Y plane. As a result, louver 140 substantially covers opening 136 and prevents particulate from flowing into opening 136 when particulate containment wall 102 is vertical. In alternative embodiments, louver 140 is positioned on particulate containment wall 102 in any manner that enables particulate containment wall 102 to function as described herein.

In addition, in the exemplary embodiment, louver 140 defines a first portion of passage 150 extending from distal end 144 to proximal end 142 of louver 140. Specifically, louver 140 includes a cylindrical body that includes a hollow inner space extending between distal end 144 and proximal end 142. Proximal end 142 is in flow communication with opening 136 which is open to the exterior of particulate containment wall 102. Distal end 144 is substantially open to interior space 128. Accordingly, louver 140 allows controlled flow of particulate 114 (shown in FIG. 1) between interior space 128 and the exterior of particulate containment wall 102 through passage 150 when particulate containment wall 102 is in a second position. In alternative embodiments, louver 140 has any shape that enables louver 140 to function as described herein.

Moreover, in the exemplary embodiment, louver 140 and, thus, the portion of passage 150 defined by louver 140 extend along an axis 188 that is angled relative to inner surface 130 and build platform 118. For example, in some embodiments, an angle 164 between inner surface 130 and axis 188 is acute, i.e., greater than 0° and less than 90°. In addition, in some embodiments, an angle 166 between build platform 118 and axis 188 is acute. In the exemplary embodiment, axis 188 extends through the centers of proximal end 142 and distal end 144. In alternative embodiments, passage 150 extends in any direction that enables particulate containment wall 102 to function as described herein. For example, in some embodiments, passage 150 is at least partially curved along its extension.

Figure 5:
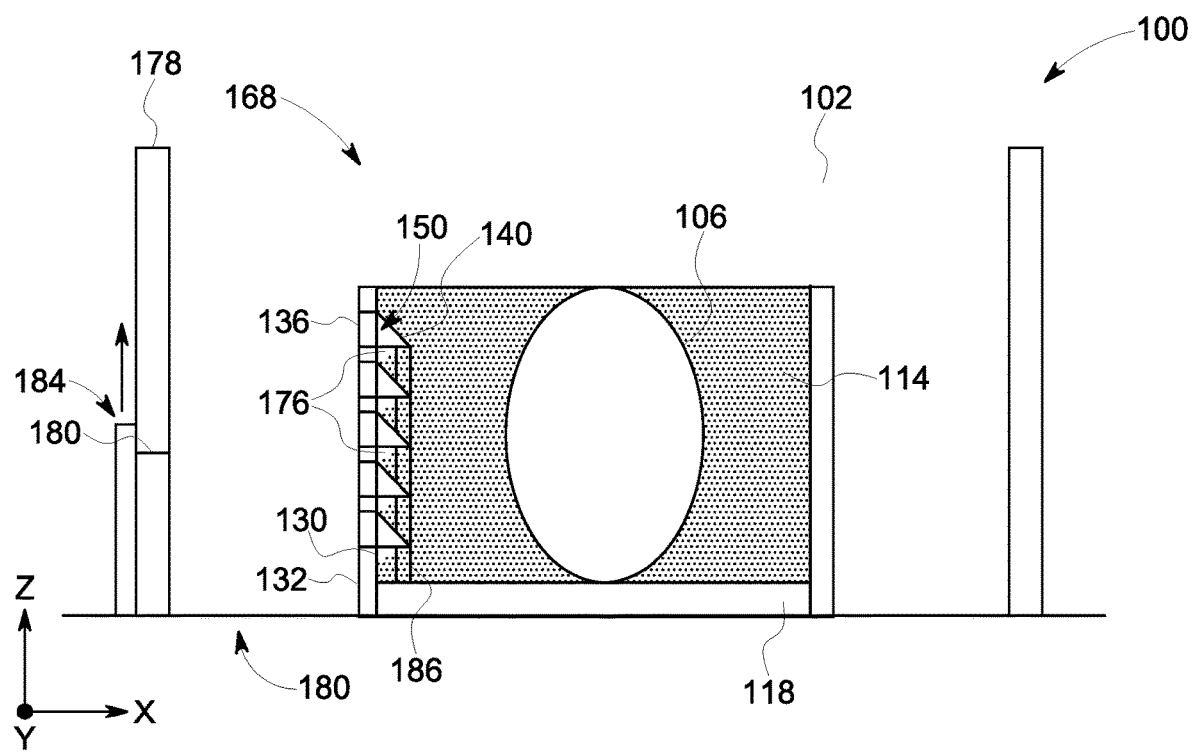
FIG. 5 is a schematic view of a portion of the additive manufacturing system shown in FIG. 1 with the particulate containment wall in a first position.
Figure 6:
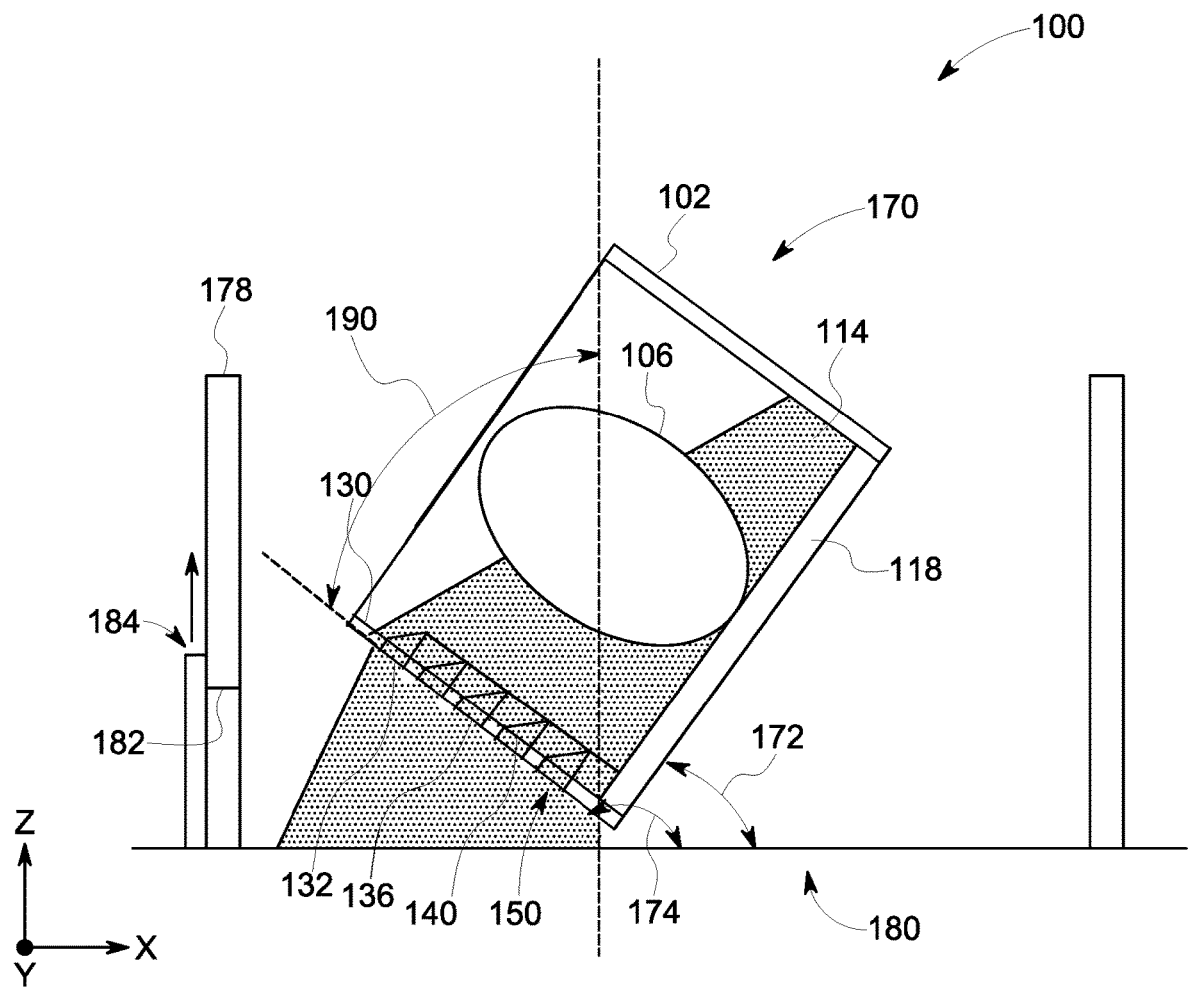
FIG. 6 is a schematic view of a portion of the additive manufacturing system shown in FIGS. 1 and 5 with the particulate containment wall in a second position.

FIG. 5 is a schematic view of a portion of additive manufacturing system 100 with particulate containment wall 102 in a first position 168. FIG. 6 is a schematic view of a portion of additive manufacturing system 100 with particulate containment wall 102 in a second position 170. Particulate containment wall 102 is positionable between first position 168 in which louver 140 prevents the unconsolidated portion of particulate 114 from flowing through passage 150 and second position 170 in which the unconsolidated portion of particulate 114 is able to flow through passage 150. In the exemplary embodiment, build platform 118 and particulate containment wall 102 are pivotable as an assembly to switch particulate containment wall 102 between first position 168 and second position 170. In first position 168, particulate containment wall 102 is substantially vertical, i.e., parallel to the Y-Z plane, and build platform 118 is substantially horizontal, i.e., parallel to the X-Y plane. In second position 170, particulate containment wall 102 extends at an angle 190 relative to the Y-Z plane, and build platform 118 extends at an angle 172 relative to the X-Y plane. In some embodiments, angle 190 and/or angle 172 are acute. In further embodiments, angle 190 and/or angle 172 are obtuse, i.e., greater than 90° and less than 180°. In the exemplary embodiment, an angle 174 between outer surface 132 of particulate containment wall 102 and the horizontal plane, i.e., the X-Y plane, is obtuse. In alternative embodiments, particulate containment wall 102 has any position that enables additive manufacturing system 100 to operate as described herein. For example, in some embodiments, build platform 118 is configured to remain stationary as particulate containment wall 102 is switched between first position 168 and second position 170.

In the exemplary embodiment, louvers 140 prevent flow of particulate 114 through openings 136 when particulate containment wall 102 is in first position 168. Specifically, louvers 140 are positioned at least partially over openings 136 to prevent particulate 114 from flowing into openings 136 from above. Moreover, each louver 140 directs particulate 114 away from and around the respective opening 136 to form a cavity 176 in particulate 114 immediately adjacent and below opening 136. As particulate 114 is added to interior space 128, particulate 114 is allowed to flow around louvers 140 but does not flow upwards towards openings 136 due to the gravitational force on the solid particulate material. Particulate 114 will slope from distal end 144 of louver 140 towards particulate containment wall 102 in a generally downward direction and settle underneath louver 140 at an angle of repose, i.e., at the maximum angle formed by a surface of a particulate when the particulate is stable. When particulate 114 is at the angle of repose, particulate 114 will be spaced from opening 136 by the depth of cavity 176 and will not flow into opening 136 unless the position of particulate containment wall 102 is switched.

Also, in the exemplary embodiment, louvers 140 allow the unconsolidated portion of particulate 114 to flow out of interior space 128 through openings 136 when particulate containment wall 102 is in second position 170. For example, particulate containment wall 102 is positioned at angle 174 relative to the X-axis when particulate containment wall 102 is in the second position. Angle 174 and angle 164 (shown in FIG. 3) of louver 140 allow particulate 114 to flow into and through passage 150. For example, in some embodiments, angle 174 is greater than angle 164 to facilitate particulate 114 flowing through passage 150. In further embodiments, angle 174 may be adjusted to control flow of particulate 114 through passage 150 as the level of particulate 114 in interior space 128 changes. In some embodiments, additive manufacturing system 100 may include an actuating system, such as actuator system 156, that switches particulate containment wall 102 between first position 168 and second position 170 and/or adjusts the angle of particulate containment wall 102 when particulate containment wall 102 is in second position 170. In alternative embodiments, particulate containment wall 102 is switched between first position 168, second position 170, and any other suitable positions in any manner that enables additive manufacturing system 100 to operate as described herein.

Moreover, in the exemplary embodiment, additive manufacturing system 100 also includes an outer wall 178 positioned around particulate containment wall 102. Outer wall 178 at least partially defines a particulate container 180 configured to receive the unconsolidated portion of particulate 114 when the unconsolidated portion of particulate 114 flows out of interior space 128 through openings 136. Specifically, outer wall 178 and particulate containment wall 102 form sides of particulate container 180 and the unconsolidated portion of particulate 114 is received between outer wall 178 and outer surface 132 of particulate containment wall 102. In the exemplary embodiment, outer wall 178 remains stationary when particulate containment wall 102 switches between first position 168 and second position 170. Outer wall 178 is rectangular and is configured to allow particulate containment wall 102 to switch between first position 168 and second position 170 without substantial disassembly or adjustment of additive manufacturing system 100. In alternative embodiments, outer wall 178 has any configuration that enables additive manufacturing system 100 to operate as described herein. For example, in some embodiments, outer wall 178 is configured to move when particulate containment wall 102 switches between first position 168 and second position 170. In further embodiments, outer wall 178 does not surround particulate containment wall 102 when particulate containment wall 102 is in first position 168 and/or second position 170.

Also, in the exemplary embodiment, outer wall 178 defines an opening 182 and includes a control device 184 to control flow of the unconsolidated portion of particulate 114 through opening 182 and out of particulate container 180. In addition, particulate container 180 is sized to receive substantially all of the unconsolidated particulate 114 from interior space 128. Accordingly, outer wall 178 allows unconsolidated particulate 114 to be drained from interior space 206 at a first rate and then retained within particulate container 180 to be removed at a second rate. The first rate may be faster than the second rate to reduce the cycle times of additive manufacturing system 100. In the exemplary embodiment, control device 184 includes a control gate that is displaced, e.g., lifted and/or pivoted, to uncover opening 182 and allow particulate 114 to flow therethrough. In alternative embodiments, additive manufacturing system 100 includes any outer wall 178 that enables additive manufacturing system 100 to operate as described herein.

In some embodiments, additive manufacturing system 100 includes one or more supports 186 configured to support particulate containment wall 102 and/or louvers 140 during the consolidation process. For example, in some embodiments, supports 186 are coupled to distal ends 144 of louvers 140 to allow louvers 140 to have an overhang configuration. Supports 186 may extend between louvers 140 and build platform 118 and/or between louvers 140 and particulate containment wall 102. In some embodiments, supports 186 include a lattice structure. Supports 186 may be formed integrally with particulate containment wall 102 and/or louvers 140 during the consolidation process. In alternative embodiments, additive manufacturing system 100 includes any supports 186 that enable additive manufacturing system 100 to operate as described herein. In some embodiments, supports 186 may be omitted.

Figure 7:
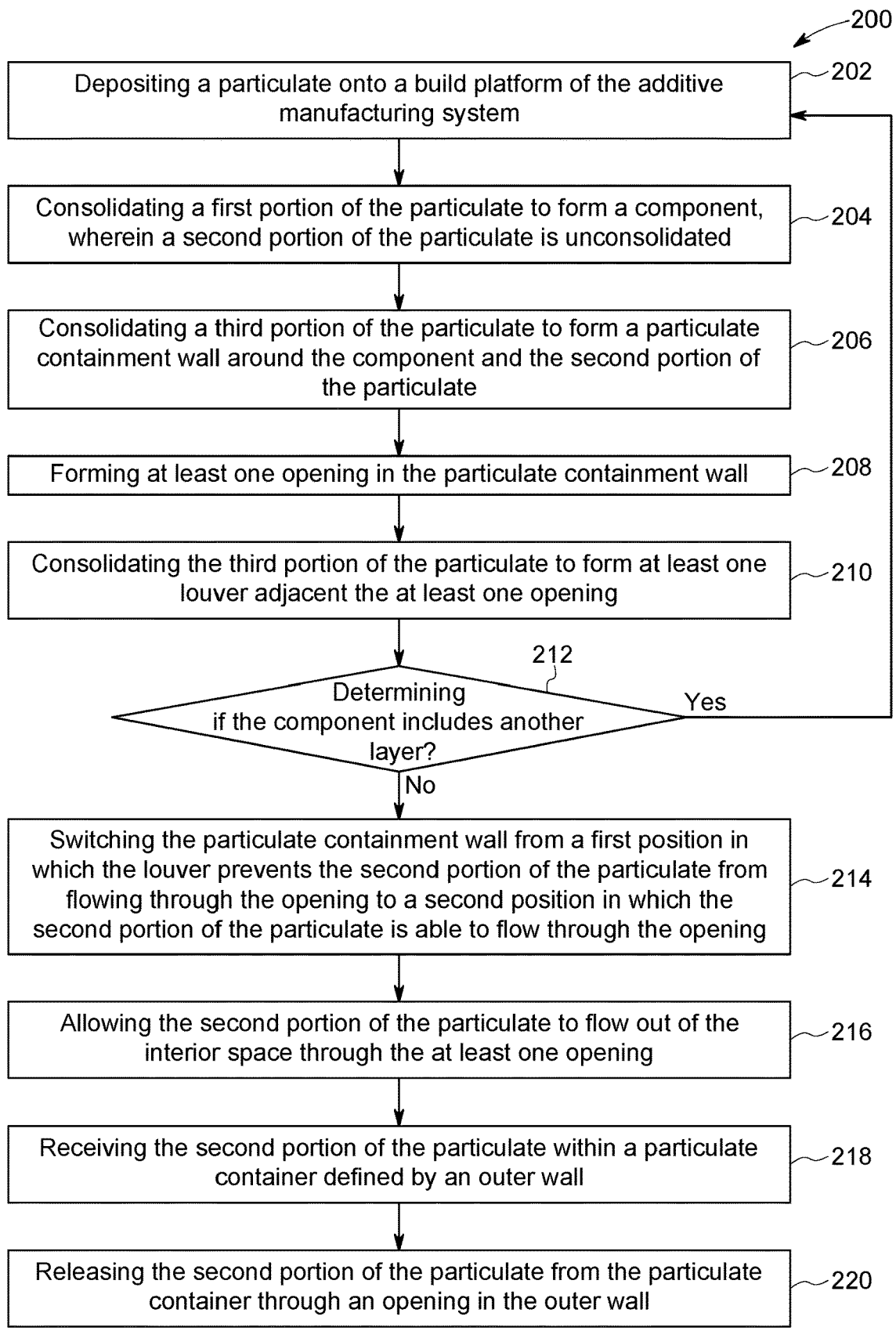
FIG. 7 is a flow chart of an exemplary method of fabricating a component using an additive manufacturing system.

FIG. 7 is a flow chart of an exemplary method 200 of fabricating component 106 using additive manufacturing system 100. In reference to FIGS. 1-7, method 200 generally includes depositing 202 particulate 114 onto build platform 118 of additive manufacturing system 100 and consolidating 204 a first portion of particulate 114 to form component 106. A second portion of particulate 114 is unconsolidated. Method 200 further includes consolidating 206 a third portion of particulate 114 to form particulate containment wall 102 around component 106 and around the second, unconsolidated portion of particulate 114. Particulate containment wall defines interior space 128. Component 106 and the second portion of particulate 114 are positioned within interior space 128.

In addition, method 200 includes forming 208 at least one opening 136 in particulate containment wall 102. For example, consolidation device 108 is configured to leave portions of particulate 114 unconsolidated within layers of particulate containment wall 102 to form openings 136. In alternative embodiments, openings 136 are formed in any manner that enables additive manufacturing system 100 to operate as described herein.

Also, method 200 includes consolidating 210 the third portion of particulate 114 to form at least one louver 140 adjacent openings 136. For example, particulate containment wall 102 includes a plurality of louvers 140 and one louver 140 is positioned adjacent each opening 136 and configured to restrict flow of particulate 114 through the respective opening 136. In the exemplary embodiment, consolidation device 108 is configured to consolidate third portion of particulate 114 to form particulate containment wall 102 including louvers 140. For example, consolidation device 108 is configured to travel along the scan path and consolidate the first and third portions of particulate 114 to form component 106 and particulate containment wall 102 at the same time. In alternative embodiments, particulate containment wall 102 and louvers 140 are formed in any manner that enables additive manufacturing system 100 to operate as described herein.

In the exemplary embodiment, method 200 involves a layer-by-layer process in which component 106 is fabricated by depositing and consolidating successive layers of particulate 114. For example, after completion of each layer, method 200 includes determining 212 if component 106 includes another layer. If component 106 includes another layer, method 200 returns to the initial step of depositing 202 particulate 114 and the intermediate steps are repeated until component 106 and particulate containment wall 102 are fully formed, i.e., until controller 152 determines that component 106 does not include another layer. Upon completion of the final layer, the completed component 106 and the second, unconsolidated portion of particulate 114 are positioned within interior space 128 and surrounded by particulate containment wall 102.

Method 200 includes switching 214 particulate containment wall 102 from first position 168 in which louver 140 prevents the second portion of particulate 114 from flowing through passage 150 to second position 170 in which the second portion of particulate 114 is able to flow through passage 150. For example, in some embodiments, particulate containment wall 102 is pivoted between first position 168 and second position 170. In some embodiments, actuator system 156 may switch particulate containment wall 102 between first position 168 and second position 170. In alternative embodiments, particulate containment wall 102 is switched between first position 168 and second position 170 in any manner that enables additive manufacturing system 100 to operate as described herein.

After switching particulate containment wall 102 from first position 168 to second position 170, method 200 includes allowing 216 the second portion of particulate 114 to flow out of interior space 128 through at least one opening 136. For example, the second portion of particulate 114 flows through passage 150 due to angle 164 of louvers 140 and angle 174 of particulate containment wall 102 in second position 170. In some embodiments, angle 174 is adjusted to control the flow the second portion of particulate 114 through passage 150 as the level of particulate 114 changes. For example, in some embodiments, particulate containment wall 102 is positionable in a plurality of positions that allow particulate 114 to flow through passage 150. Particulate containment wall 102 may be successively switched to successive positions as particulate 114 is drained from interior space 128. In alternative embodiments, particulate 114 is directed through openings 136 in any manner that enables additive manufacturing system 100 to operate as described herein.

After exiting interior space 128, the second portion of particulate 114 is received 218 within particulate container 180 defined by outer wall 178. Method 200 also includes releasing 220 the second portion of particulate 114 from particulate container 180 through opening 182 in outer wall 178. For example, control device 184 is opened to allow particulate 114 to flow out of particulate container 180 through opening 182.

The embodiments described herein include an additive manufacturing system including a louvered particulate containment wall. The louvered particulate containment wall defines an interior space and retains particulate within the interior space to facilitate precise fabrication of a component and to control the amount of particulate required to fabricate the component. The louvered particulate containment wall includes at least one opening and at least one louver extending adjacent the at least one opening. The at least one louver is positioned to prevent unconsolidated particulate from exiting the interior space through the at least one opening when the louvered particulate containment wall is in a first position. For example, in some embodiments, the at least one louver and the opening define a passage that is angled relative to a planar surface of the louvered particulate containment wall such that the louver prevents particulate from entering the opening when the particulate containment wall is in a vertical position. The louvered particulate containment wall may be positioned in a second position that allows particulate to flow through the at least one opening in the louvered particulate containment wall. Accordingly, the additive manufacturing system facilitates the controlled removal of unconsolidated particulate from the interior space of the particulate containment wall after fabrication of the component.

An exemplary technical effect of the methods, systems, and apparatus described herein includes at least one of: a) reducing the time required to remove unconsolidated particulate from an additive manufacturing system, b) reducing operator exposure to particulate in an additive manufacturing system, c) reducing the amount of energy required for additively manufacturing a component, and d) reducing the cost of additively manufacturing a component.

Exemplary embodiments of additive manufacturing systems are described above in detail. The additive manufacturing systems, and methods of using and manufacturing such systems are not limited to the specific embodiments described herein, but rather, components of systems and/or steps of the methods may be utilized independently and separately from other components and/or steps described herein. For example, the methods may also be used in combination with other additive manufacturing systems, and are not limited to practice with only the additive manufacturing systems, and methods as described herein. Rather, the exemplary embodiment can be implemented and utilized in connection with many other additive manufacturing systems.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of fabricating a component using an additive manufacturing system, said method comprising:
   depositing a particulate onto a build platform of the additive manufacturing system;
   consolidating a first portion of the particulate to form the component, wherein a second portion of the particulate is unconsolidated;
   positioning a particulate containment wall around the component and the second portion of the particulate, the particulate containment wall defining an interior space and at least one opening through the particulate containment wall, wherein the component and the second portion of the particulate are positioned within the interior space;
   coupling at least one louver to the particulate containment wall so that each of the at least one louver is coupled adjacent to a corresponding one of the at least one opening in the particulate containment wall, wherein each of the at least one louver defines a respective passage in flow communication with its corresponding adjacent opening; and
   switching the particulate containment wall, as a whole, to pivot from a first position in which each of the at least one louver prevents the second portion of the particulate from flowing through its respective passage to a second position in which the second portion of the particulate is able to flow through the respective passage, thereby causing the second portion of the particulate to flow out of the interior space through the at least one opening.

2. The method in accordance with claim 1, wherein each of the at least one louver includes a proximal end, a distal end, and a surface extending between the distal end and the proximal end, and wherein said coupling of the at least one louver to the particulate containment wall comprises coupling the proximal end of each of the at least one louver to the particulate containment wall such that the surface extends at an angle relative to the particulate containment wall.

3. The method in accordance with claim 2, wherein coupling the proximal end of each of the at least one louver to the particulate containment wall comprises coupling the proximal end of each of the at least one louver to the particulate containment wall at a location at least partially above the adjacent opening corresponding thereto, and wherein each of the at least one louver extends away from the particulate containment wall such that a distal end of each of the at least one louver is positioned below its corresponding opening.

4. The method in accordance with claim 1, wherein depositing the particulate onto the build platform of the additive manufacturing system comprises depositing the particulate onto the build platform in a plurality of successive layers, the method further comprising directing the particulate away from the at least one opening using the at least one louver as the particulate is deposited onto the build platform.

5. The method in accordance with claim 1, wherein positioning the particulate containment wall around the component and the second portion of the particulate comprises consolidating a third portion of the particulate to form the particulate containment wall.

6. The method in accordance with claim 5, wherein coupling the at least one louver to the particulate containment wall comprises consolidating the third portion of the particulate to form the at least one louver and the particulate containment wall.

7. The method in accordance with claim 1, wherein switching the particulate containment wall between the first position and the second position comprises pivoting the build platform and the particulate containment wall as an assembly.

8. The method in accordance with claim 1 further comprising positioning an outer wall around the particulate containment wall, wherein the outer wall and the particulate containment wall define a particulate container configured to receive the second portion of the particulate as the second portion of the particulate flows out of the interior space through the at least one opening.

9. The method in accordance with claim 8 further comprising releasing the second portion of the particulate from the particulate container through an opening in the outer wall.

10. The method in accordance with claim 1, wherein the at least one opening comprises a plurality of openings defined in the particulate containment wall through which the second portion of particulate flows out from the interior space.

11. The method in accordance with claim 10, wherein the at least one louver comprises a plurality of louvers each located adjacent to a corresponding one of the plurality of openings defined in the particulate containment wall.

* * * * *